Dec. 23, 1958  H. B. STEWART  2,865,826
NEUTRONIC REACTOR
Filed July 7, 1953  3 Sheets-Sheet 1

INVENTOR.
Hugh B. Stewart
BY
Roland A. Anderson
Attorney

Dec. 23, 1958   H. B. STEWART   2,865,826
NEUTRONIC REACTOR
Filed July 7, 1953   3 Sheets-Sheet 2

INVENTOR.
Hugh B. Stewart
BY
Roland A. Anderson
Attorney.

Dec. 23, 1958   H. B. STEWART   2,865,826
NEUTRONIC REACTOR

Filed July 7, 1953   3 Sheets-Sheet 3

INVENTOR.
Hugh B. Stewart
BY
Roland A. Anderson
Attorney.

United States Patent Office 2,865,826
Patented Dec. 23, 1958

2,865,826

NEUTRONIC REACTOR

Hugh B. Stewart, Scotia, N. Y., assignor to the United States of America as represented by the United States Atomic Energy Commission Application July 7, 1953, Serial No. 366,621

7 Claims. (Cl. 204—193.2)

The present invention relates generally to neutronic reactors, and more specifically to neutronic reactors designed for the irradiation of materials.

There are many well known reasons for irradiating materials. Some of these reasons are connected with nuclear research, others with the control of the quality of materials to be used within neutronic reactors, and still others are connected with production of radioactive isotopes. In virtually all of the cases of material irradiation resulting from these considerations, it is desirable to utilize a neutronic reactor having a thermal neutron flux which is large compared to the power level of the reactor. It is one of the objects of the present invention to provide a reactor suitable for the irradiation of materials, particularly a reactor which produces a relatively large thermal neutron flux relative to the power level of the reactor.

It is also an object of the present invention to provide a neutronic reactor suitable for irradiating objects in which the absorption of neutrons in the irradiated object has a relatively large effect upon the reactivity of the reactor. Such a reactor is valuable for determining the characteristics of the material irradiated from a neutronic point of view, for example, the neutron capture cross section, the neutron scattering cross section, or the neutron fission cross section of the material. The change in the reactivity of such a reactor is measurable by the displacement of control elements in the reactor structure as a result of the neutron absorption of the material inserted into the reactor. These displacements of the control elements may be calibrated in terms of the displacement produced by materials having known nuclear properties, thereby providing a direct indication of the nuclear properties of the material being irradiated.

The inventor has found that a neutronic reactor constructed with a core consisting of neutron moderator material surrounded by a region containing fissionable material fulfills the requirements set forth above. Other objects and advantages of a reactor constructed in this manner will become readily apparent to the man skilled in the art from a further reading of this specification, particularly when viewed in the light of the drawings in which.

Figure 1:
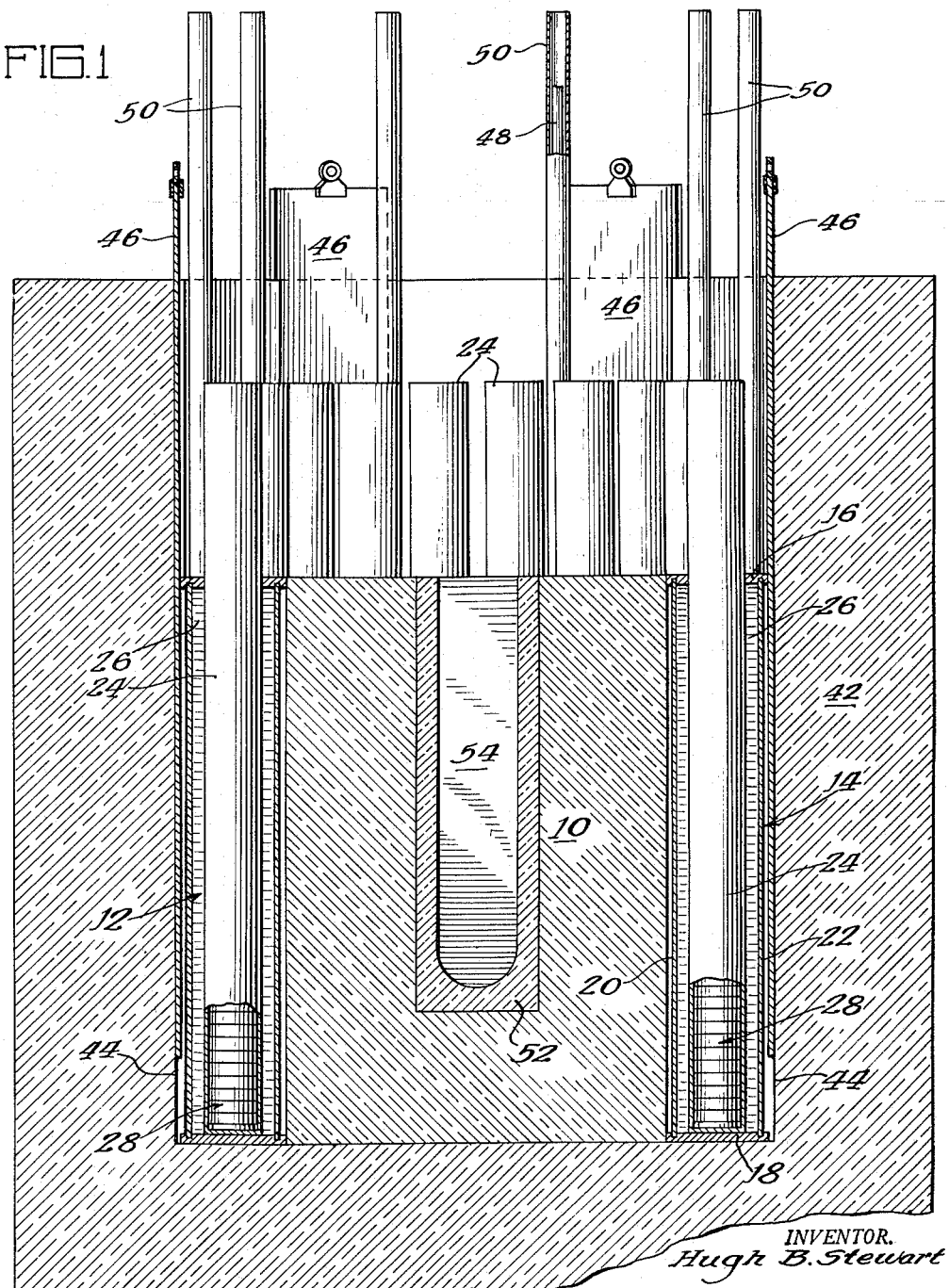
Figure 1 is a vertical sectional view of a neutronic reactor constructed according to the teachings of the present invention.
Figure 2:
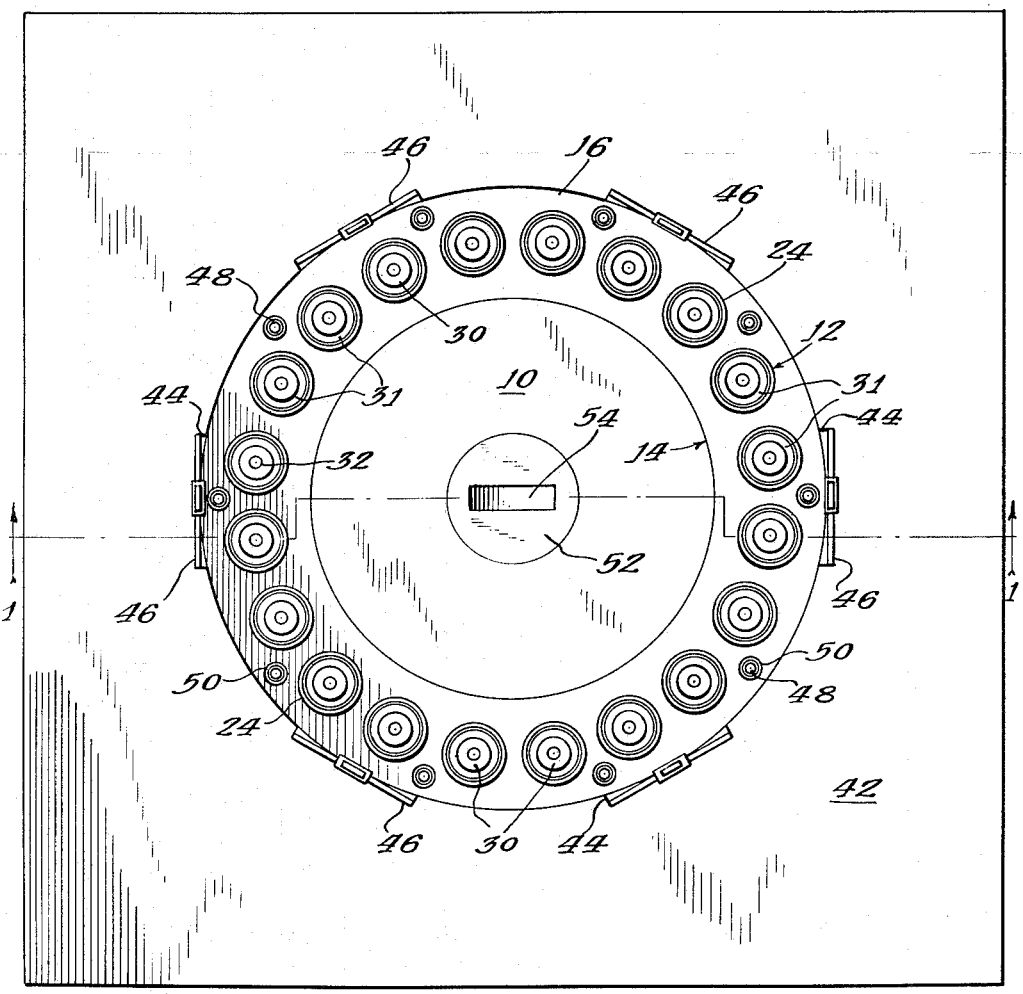
Figure 2 is a plan view of the neutronic reactor shown in Figure 1, the line 1—1 indicating the plane of the section shown in Figure 1.

The neutronic reactor shown in the figures has a core 10 surrounded by an active portion 12. The core 10 is constructed of nonfissionable moderator materials having a moderating ratio greater than that of water. The moderating ratio R of a material is defined by the expression $$R = \frac{\sigma_s \xi}{\sigma_c}$$

where $\sigma_s$ is the neutron scattering cross section of the material, $\sigma_c$ is the neutron capture cross section of the material, and $\xi$ is the mean logarithmic energy loss per collision of a neutron in the material. In a particular embodiment of the invention which will be described as an example throughout this specification, the core 10 is constructed of graphite with a neutron diffusion length of approximately 50 centimeters. The core could also have been constructed of beryllium, or heavy water, as well as other materials having a suitable moderating ratio.

The active portion 12 of the reactor is in the form of a hollow right cylinder with an inner radius approximately equal to the radius of the core 10. The active portion 12 must supply sufficient neutrons to replace the neutrons absorbed in the core 10, those absorbed without fission in the active portion 12, and those escaping from the reactor. Hence, the active portion 12 may be in the form of a liquid solution, or a slurry of fissionable materials and moderator materials disposed within a container, or a heterogeneous structure, such as shown in the figures.

In the construction of the active portion 12 of the reactor shown in the figures, a tank 14 having cylindrical spaced walls and an annular bottom sealed therebetween is disposed about the core 10. The tank 14 is constructed of materials having neutron capture cross sections at least as small as stainless steel, and suitable structural properties for withstanding the pressure and forces exerted upon the tank 14 by the other reactor components. In one particular embodiment of the reactor, aluminum with a neutron capture cross section of 0.23 barn was found to be satisfactory.

The tank 14 is provided with a cover 16 and a bottom 18, both of which are sealed to an inner wall 20 and an outer wall 22. A plurality of cylindrical tubes 24 are disposed within the tank 14 and extend from the bottom 18 through the top 16. These tubes 24 are also hollow and may be constructed of any of the materials suitable for the tank 14, preferably aluminum.

The tank 14 is filled with a liquid moderator, and the fissionable material is disposed within the tubes 24. The liquid moderator, designated 26, may be of any liquid having a neutron moderating ratio at least equal to that of water, and in the particular construction of the reactor described herein, the liquid moderator 26 is water.

Figure 3:
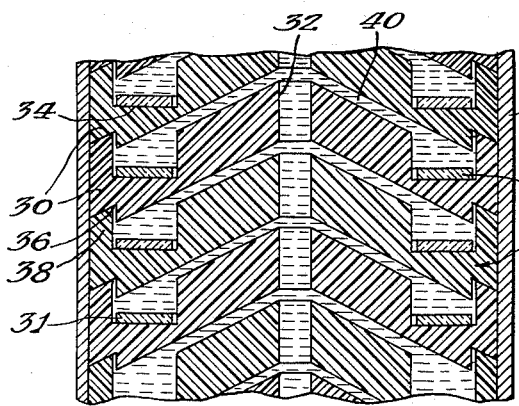
Figure 3 is an enlarged view showing a fragment of one of the fuel tubes shown in Figures 1 and 2.

As illustrated in Figure 3, the fuel elements 28 disposed within the tubes 24 comprise conical wafers 30 of neutron moderating material and hollow annular discs 31 of fissionable material. Each of the conical wafers 30 is provided with a bore 32 at the vertex of the cone, and is mounted within the tubes 24 with the vertex of the wafer 30 directed toward the top 16 of the tank 14. A groove 34 in the upper surface of the wafer 30 extends around and adjacent to the periphery thereof, and the disc 31 of fissionable material is disposed within the groove 34. Each wafer 30 is also provided with a recess 36 adjacent to the periphery thereof on the lower surface of the wafer 30, and a protruding rim 38 on the upper surface above and adjacent to the recess 36. As a result, the fuel elements 28 may be stacked one above another, as shown in Figure 3.

In the particular construction of the reactor here described, the neutron moderating wafers 30 are constructed of polyethylene, but other moderating materials could also be used. A more detailed description of the wafer-type fuel element here disclosed is contained in the patent application, Serial No. 236,644, entitled "Fuel Element" by Henry Hurwitz, Jr., Harvey Brooks, Clifford Mannal, John H. Payne and Emmeth A. Luebke, filed July 13, 1951, now Patent No. 2,799,642 dated July 16, 1957.

The spaces between the fuel elements 28 are filled with a liquid moderator 40, as shown in Figure 3. Since the moderator 40 is in contact with the fuel discs 31, it must consist of materials which are not highly reactive chemically with the material of the discs 31. In the described embodiment, fuel discs 31 constructed of a compound of uranium and aluminum and a moderator 40 of light paraffin oil have been found to be satisfactory.

Figure 4:
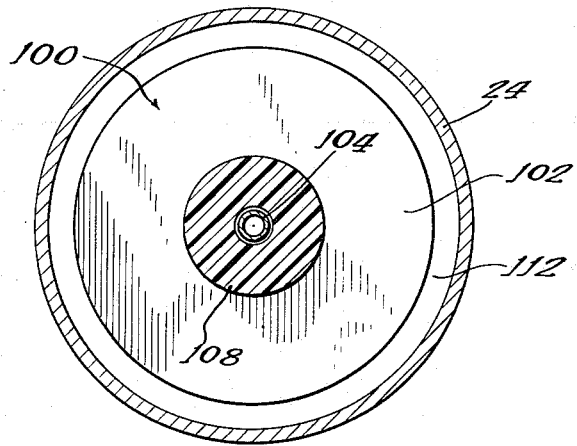
Figure 4 is an enlarged horizontal sectional view through one of the fuel tubes of the reactor shown in Figures 1 and 2 showing a modified form of fuel element.
Figure 5:
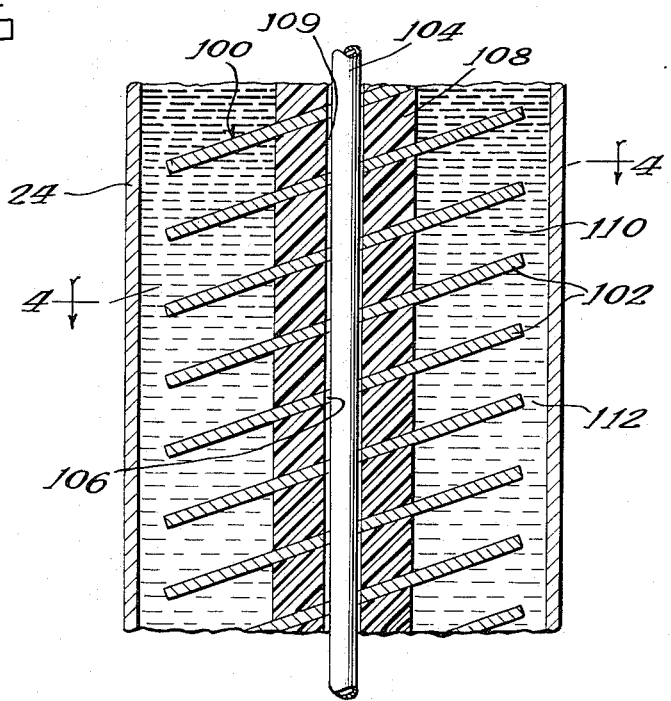
Figure 5 is a vertical sectional view of the fuel tube shown in Figure 4 showing the modified form of fuel element, Figure 4 being taken on line 4—4 shown in Figure 5.

An alternate form of fuel element is shown in Figures 4 and 5. In this embodiment, the fuel elements, designated 100, are in the form of solid discs 102 which are provided with central apertures 106 and spaced from each other by spacers 108 of neutron moderating materials. The spacers 108 are provided with apertures 109 which are aligned with the apertures 106 in the discs 102, and a hollow rod 104 is mounted centrally within the tubes 24 and traverses the apertures 106 and 109. The spacers 108 are in the form of skewed cylinders, thereby maintaining the discs 102 at an angle relative to the rods 104 and the tubes 24. The diameter of the fuel element discs 102 is approximately the same as the diameter of the tubes 24, but since the discs 102 are angularly disposed relative to the tubes 24 a gap 112 is provided between the elements to permit bubbles to pass upwardly through the tubes 24. The voids within the tubes 24 are filled with a liquid moderator 110.

The modified form of fuel element may replace the fuel element 28 illustrated in Figure 3, the dimensions and materials of other portions of the reactor remaining the same. The fuel discs 102 are constructed of an alloy of aluminum and uranium 235, the spacers 108 are constructed of polyethylene, the rod 104 is constructed of aluminum as are the tubes 24 and the rod 104 is approximately ⅛ inch in diameter and 18 inches long. The diameter of the discs 102 is approximately 2 inches and the apertures 106 in the discs 102 are approximately 3/16 inch in diameter. The diameter of the spacers 108 is approximately 1 inch and the diameter of the apertures 109 in the spacers 108 is approximately 3/16 inch. The spacers 108 are skewed at an angle at 15° relative to the horizontal plane. The moderator 110 may be a light paraffin oil, as in the case of the fuel element set forth in Figure 3.

In the reactor, twenty tubes 24 each contain approximately 60 fuel elements 100, each fuel element containing about 2.7 grams of uranium containing 93 percent $U^{235}$ alloyed with aluminum as discs 102. While uranium containing 93 percent $U^{235}$ has been used, it will be understood that essentially pure $U^{235}$ is more desirable, and that its use will not alter appreciably the dimensions of the reactor.

A reflector 42 of materials having a neutron moderating ratio at least as great as that of water surrounds the tank 14. Slots 44 are disposed within the reflector 42 adjacent to the tank 14, and sheets 46 of material having a neutron absorption cross section of at least 100 barns are slidably disposed within the slots 44. Control rods 48, also constructed of materials having neutron capture cross sections of at least 100 barns, extend into the tank 14 through the cover 16. The control rods 48 are translatable within sleeves 50 which are sealed to the cover 16 and the bottom 18 of the tank 14. The sleeves 50 prevent the liquid moderator 26 from contacting the control rods 48. Both the control rods 48 and the safety sheets 46 are slidable within the sleeves 50 and the slots 44 and may be reciprocated by means well known in the art, such as that described in the patent application of Fermi et al., Serial No. 568,904, filed December 19, 1944, now Patent No. 2,708,656 dated May 17, 1955.

In the particular example illustrated, the reflector 42 consists of graphite and is a four foot cube. Control rods 48 are constructed of cadmium and are at least eighteen inches long, and the control sheets 46 are 4 inch by 19 inch sheets of 1/32 inch cadmium.

The core 10 of the reactor is provided with a cylindrical column 52 along its central axis. A well 54 is disposed within the column 52 to permit the insertion of materials to be irradiated into the core 10 of the reactor. The column 52 is constructed of moderator materials such as those described for the core 10, namely, graphite in the particular embodiment described.

The maximum thermal neutron flux density in reactors thus constructed occurs at the center of the core 10. This results from the fact that the neutrons present in the reactor originate in the active portion 12 of the reactor as fast neutrons, and those neutrons migrating into the core 10 of the reactor are slowed down by collisions with atoms of the moderator materials encountered in the reactor. As a result, there is a decreasing fast neutron flux in the direction of the center of the core 10 of the reactor, and a corresponding increase in the thermal neutron flux approaching the center of the core 10 of the reactor.

The magnitude of the thermal neutron flux maximum occurring at the center of the core 10 of the reactor will depend upon the net neutron gain to the core 10 from the active portion 12 of the reactor, the leakage of neutrons from the core to the exterior of the reactor through the upper and lower surfaces of the core, and the number of neutrons absorbed by the moderator material within the core 10. Because of this latter neutron loss factor, it is desirable to construct the core 10 of materials having very small neutron capture cross sections, such as those described.

It is also necessary to select the diameter of the core of the reactor according to the physical properties of the materials used for the core. When a fast neutron is ejected from an atom of fissionable material into a neutron moderating medium, it is first slowed to thermal energy through a distance called the Fermi age, $\sqrt{\tau}$, and then diffuses through the material until it is absorbed, the distance the neutron travels at thermal energy before being absorbed is the diffusion length, L. It is clear that the diameter of the core of the reactor must be sufficiently large to enable neutrons to slow from fast to thermal energy. Also, if the diameter of the core is too large, absorption of neutrons of thermal energy by the core will reduce the thermal neutron flux.

It has been found that the radius of the core should be approximately equal to or greater than the effective slowing down length and approximately equal to or less than the effective diffusion length of the core material. Thus, the diffusion length of the core material must be greater than the slowing down length of the core material, and the core material must have a moderating ratio greater than that of water.

In order to apply these limitations to a reactor, the "neutronic core" rather than the physical core 10 is to be considered, i. e., the total moderating region within a figurative cylinder of fissionable material, including the wall 20 of the tank 14, the portion of the tubes 24 confronting the wall 20, and the moderator 26 disposed between the tubes 24 and the wall 20, as well as the graphite core 10. The effective slowing down length, and diffusion length, depend upon the component lengths associated with the materials within the region and the relative volumes of the component materials.

The following table sets forth approximate values for the diffusion length, L, and slowing down length, $\sqrt{\tau}$, for some of the well known moderator materials.

| Moderator | Density (in grams/cm.³) | Diffusion Length L (in cm.) | Slowing Down $\sqrt{\tau}$ (in cm.) |
|---|---|---|---|
| H₂O | 1.00 | 2.88 | 5.7 |
| D₂O | 1.10 | 100 | 11.0 |
| Be | 1.84 | 23.6 | 9.9 |
| C (graphite) | 1.62 | 50.2 | 18.7 |

In the particular example of the reactor illustrated in the figures, the core 10 has a diameter of approximately 12 inches, the inner diameter of the tank 14 being 12 inches and the outer diameter of the tank 18 inches. The height of the tank 14 and graphite core 10 is approximately 18 inches. Tubes 24 are approximately 24 inches long and have a diameter of approximately 2 inches, so a minimum slightly less than ½ inch of water is disposed between the tubes 24 and the wall 20 of the tank 14. The illustrated reactor has a neutronic core radius of approximately 6½ inches. The effective slowing down length of this neutronic core is 5.6 inches, and the effective diffusion length is 6 inches. The reactor has been designed to operate at a temperature of approximately 20° C., and since it is cooled only by convection, appreciable powers cannot be obtained, the temperature of the reactor being confined to less than 100° C.

Having selected the materials and calculated the diameter of the core, it is then necessary to construct the active portion of the reactor with the view of making the entire reactor critical. A first approximation may be made to this problem by considering the reactor to be on an infinite thin slab of selected height with reflectors on either side thereof, one of the reflectors forming the core of the reactor. It is of course true, that neutrons are only lost from the top and bottom of the core, while a true reflector will lose a certain number of neutrons from all surfaces, and hence calculations based upon a reflected thin slab reactor will be somewhat less favorable from the point of view of criticality than the actual geometrical structure. In this connection, the copending patent application of Eugene P. Wigner, entitled "Neutronic Reactor," Serial No. 314,595, filed October 14, 1952, now Patent No. 2,831,806 dated April 22, 1958, discloses a number of reactors constructed with slab active portions. However, if a more rigorous solution of critical size is desired, those skilled in the art will readily calculate the critical size of the proposed reactor, treating the reactor as a three region problem, the core, the active portion, and the reflector being the three regions. Of course, the dimensions set forth in the illustrated reactors result in a structure which will sustain a neutron chain reaction without further calculations.

One of the advantages of the reactor disclosed is that the neutronic properties of objects inserted into well 54 positioned centrally in the core 10 of the reactor require relatively large changes in the position of the control elements 48 to maintain criticality, thus making the reactor an efficient device for determining the nuclear properties of materials. In order to achieve this result, it is desirable that the volume of the region containing fissionable materials be maintained relatively small. It has been found that best results are achieved when fissionable materials are used which produce a relatively large number of neutrons for each neutron absorbed in the total mass of the fissionable element, i. e., when materials enriched in the fissionable isotopes of the elements used are employed. The term "fissionable isotope" refers to an isotope of an element that fissions when bombarded by neutrons of thermal energy. For this reason, materials consisting of fissionable elements and containing at least 50 percent fissionable isotopes, such as $U^{235}$, $U^{233}$, or plutonium 239, have been found to be suitable fissionable materials for the discs 31.

From the foregoing disclosure, the man skilled in the art will readily devise many other devices and reactors within the scope of the present invention. For example, the core of the reactor need not be cylindrical in shape, as illustrated, but could equally well be spherical, hexagonal, octagonal, or some other geometrical configuration suitable for pile construction. Hence, it is intended that the scope of the present invention be not limited to the specific foregoing disclosure, but rather only by the appended claims.

What is claimed is:

1. A neutronic reactor comprising a core having a moderating ratio greater than H₂O and consisting of neutron moderator materials, the overall dimensions of said core in at least one plane being equal to or greater than twice the effective slowing down length and equal to or less than twice the effective diffusion length for neutrons in the core materials, an active portion provided with fissionable material containing at least 50 percent fissionable isotopes immediately surrounding the core, and a reflector disposed about the active portion consisting of neutron moderating materials.

2. A neutronic reactor comprising the elements of claim 1 wherein the core comprises graphite.

3. A neutronic reactor comprising, in combination, a cylindrical core having a moderating ratio greater than H₂O and consisting of neutron moderating materials, the radius of said core being at least equal to the slowing down length and not greater than the diffusion length for neutrons in the core, and the height of said core being at least equal to the diameter thereof, a tank having spaced cylindrical walls and an annular bottom sealed therebetween disposed about the core, a liquid moderator disposed within the tank, a plurality of tubes extending through the tank and sealed thereto, a plurality of bodies of fissionable material containing at least 50% fissionable isotopes disposed within the tubes, and a neutron reflector disposed about the periphery of the tank.

4. A neutronic reactor comprising the elements of claim 1 wherein the core comprises a hollow cylinder of water and a cylinder of graphite disposed within the cylinder of water.

5. A neutronic reactor comprising, in combination, a core having a moderating ratio greater than H₂O and consisting of neutron moderating materials provided with a well centrally thereof, all dimensions of the core in at least one plane being at least equal to twice the slowing down length and not greater than twice the diffusion length for neutrons in the core materials, an active portion provided with fissionable material containing at least 50 percent fissionable isotopes immediately surrounding the core, and a reflector disposed about the active portion consisting of neutron moderating materials.

6. A neutronic reactor comprising, in combination, a cylindrical core having a moderating ratio greater than H₂O and consisting of moderating materials, the diameter of said core being at least equal to twice the slowing down length and not greater than twice the diffusion length for neutrons in the core medium and the height of said core being at least equal to the diameter thereof, a tank having spaced cylindrical walls and an annular bottom sealed therebetween disposed about the core, a liquid moderator disposed within the tank, a plurality of tubes extending through the tank and sealed thereto, a plurality of fuel elements disposed within the tubes, said fuel elements having discs containing fissionable material containing at least 50% fissionable isotopes and spacers constructed of neutron moderating materials between the discs, a paraffin oil disposed within the voids in the tubes, and a neutron reflector disposed about the periphery of the tank.

7. A neutronic reactor comprising, in combination, a cylindrical core of graphite, a tank having spaced cylindrical walls and an annular bottom sealed therebetween disposed about the core, a water moderator disposed within the tank, a plurality of tubes extending through the tank and sealed thereto, a paraffin oil moderator disposed within the tubes, a plurality of fuel elements disposed within the tubes submerged in the oil, said fuel elements comprising discs containing an alloy of fissionable material containing at least 50% fissionable isotopes and aluminum, polyethylene spacers disposed between the discs, said discs being angularly disposed relative to the horizontal plane, the neutronic core of the reactor including the graphite core, the wall of the tank between the tubes and the graphite core, and the portion of the water moderator between the tubes and said wall of the tank, said neutronic core having a radius at least equal to the slowing down length and not greater than the effective diffusion length for neutrons in said materials, and a neutron reflector disposed about the periphery of the tank comprising graphite.

References Cited in the file of this patent
UNITED STATES PATENTS

| | | |
|---|---|---|
| 2,708,656 | Fermi et al. | May 17, 1955 |
| 2,798,848 | Kingdon | July 9, 1957 |
| 2,799,642 | Hurwitz et al. | July 16, 1957 |

OTHER REFERENCES

Chemical Eng., January 1951, pp. 113–116.
Le Journal de Physique et le Radium, vol. 12 July–Sept. 1951, pp. 751–755.
Nucleonics, June 1953, pp. 65–69.
Nucleonics, May 1953, pp 38–41.